United States Patent [19]

Parhiskari

[11] Patent Number: 4,839,833

[45] Date of Patent: Jun. 13, 1989

[54] PROGRAMMABLE DISPLAY ENGINEERING SCALE

[76] Inventor: Mustafa Parhiskari, 7615 Monrovia, Lenexa, Kans. 66216

[21] Appl. No.: 5,872

[22] Filed: Jan. 21, 1987

[51] Int. Cl.[4] .......... G01B 3/02; G09G 3/18; G01C 3/00

[52] U.S. Cl. .......... 364/562; 364/105.01; 364/710.11; 33/491; 33/494; 33/784; 340/753; 377/24; 362/23

[58] Field of Search .......... 364/560–564, 364/708, 705.01, 710.01, 710.02, 710.08, 710.10, 710.11, 710.14; 33/125 R, 125 A, 348, 1 B, 1 C, 1 D, 1 G, 491, 494; 116/202; 340/753, 754, 815.27; 377/24; 362/23, 26, 800

[56] References Cited

U.S. PATENT DOCUMENTS

| | | | |
|---|---|---|---|
| 1,354,977 | 10/1920 | Kammyer | 33/491 |
| 2,634,504 | 4/1953 | Jennings, Jr. | 33/491 |
| 2,672,692 | 3/1954 | Kucera | 33/491 |
| 2,826,816 | 3/1958 | Major | 33/491 |
| 3,594,783 | 7/1971 | Bullock | 340/347 R |
| 3,765,764 | 10/1973 | Niss | 356/372 |
| 3,872,288 | 3/1975 | Sampey | 364/561 |
| 3,955,073 | 5/1976 | Carew et al. | 364/561 |
| 3,965,340 | 6/1976 | Renner et al. | 364/555 |
| 4,158,229 | 6/1979 | Woo, Jr. et al. | 340/753 |
| 4,242,980 | 1/1981 | Go | 364/561 |
| 4,282,571 | 8/1981 | Giovanoli et al. | 33/125 |
| 4,435,904 | 3/1984 | Lozan et al. | 33/143 X |
| 4,491,829 | 1/1985 | McTamaney | 340/753 X |
| 4,707,928 | 11/1987 | Bennett et al. | 33/491 |
| 4,716,412 | 12/1987 | Arnoux et al. | 340/753 |

*Primary Examiner*—Parshotam S. Lall
*Assistant Examiner*—Joseph L. Dixon
*Attorney, Agent, or Firm*—Litman McMahon & Brown

[57] ABSTRACT

A programmable display engineering scale instrument includes a scale base such as a drafting machine type scale, an electronic display device including a plurality of rows of column aligned display elements, scale selection switches, and circuitry interpreting the operation of the selection switches to cause the display of corresponding linear scales. The circuitry includes a switch encoder which generates unique binary addresses corresponding to each of the switches. A memory device stores bit patterns which when addressed cause the activation of patterns of display elements to display a corresponding linear scale. The display elements are interconnected in selected groups for simultaneous activation to simplify the circuitry of the programmable scale instrument.

18 Claims, 3 Drawing Sheets

PROGRAMMABLE DISPLAY ENGINEERING SCALE

FIELD OF THE INVENTION

The present invention relates to distance measuring instruments and, more particularly, to an engineering scale wherein scale divisions and subdivisions are formed by activated elements of an electronic display device and wherein the scales are selectively alterable.

BACKGROUND OF THE INVENTION

Draftsmen, architects, engineers, and others often find a need in their work for multiple scales to measure or represent linear distances in various units or ratios or to translate from one set of dimensional units to another. This need has traditionally been met by the provision of linear scale instruments having a multiplicity of distance scales printed or embossed on their surfaces. Conventional scale instruments may include two, four, or six distances scales depending on the cross sectional shape of the instrument. Scale instruments for drafting machines generally provide only two scales. Often, a number of scale instruments are required to be on hand to accommodate the various types of distance units and scale ratios which may be encountered. The presence of such a number of instruments often clutters a drafting board, and inconveniences and inefficiencies are encountered in finding the right scale instrument and manipulating it to search for the particular scale needed.

Scale instrument arrangements are known which employ interchangeable scale strips. In one such instrument, one scale strip is placed in a use position while two others are placed in storage positions within the instrument. In another arrangement, scale strips may be selectively extended from the instrument body or retracted into a storage position. However, such structural approaches to providing multiple scales achieve little advantage over conventional one-piece scale instruments, such as triangular scales, in the scales which may be selected.

Electronic solutions have been attempted to provide more flexible distance measurement. In such attempts, a single row of electronic display elements is provided along the edge of an instrument. Numbers representing a distance are punched in on keys on the instrument. Circuitry interprets the numbers entered and activates the appropriate display elements to represent the end points of the desired distance. While some advantages may be realized from such an instrument, the requirement of entering several numerals would become tedious if a large number of distances needed to be entered. Additionally, such an instrument would be very difficult to use in measuring an existing distance.

SUMMARY OF THE INVENTION

The present invention provides a linear scale instrument which is much more flexible in use than the scale instruments commonly in current use. The present invention is a programmable display scale instrument including a scale base, an electronic display including a plurality of parallel rows of column aligned display elements, scale selection switches, and circuitry interconnecting the display elements and switches in such a manner that any of a plurality of linear scales can be displayed by the operation of a corresponding selection switch.

In a preferred embodiment of the present invention, the display elements are interconnected in selected groups for simultaneous activation. The groups are connected to respective output terminals of a memory device storing bit patterns which, when addressed, write activating logic levels to selected ones of the groups to cause an associated pattern of scale divisions and subdivisions to be displayed. The selection switches are connected to the input terminals of an encoder device which generates a unique binary address number in response to the closure of an associated switch. The address generated selects words or bytes in the memory to cause the display of a scale pattern of display elements corresponding to the particular switch operated.

The electronic display device is preferably a liquid crystal display (LCD) device. The scale base is preferably in the form of a drafting machine scale and includes standard connectors for attachment to a drafting machine. The circuitry is advantageously implemented using complementary symmetry metal oxide semiconductor (CMOS) technology which together with the LCD display is very power efficient. The programmable scale instrument may be powered either by a small battery or by photovoltaic cells.

OBJECTS OF THE INVENTION

The principal objects of the present invention are: to provide a programmable display engineering scale instrument capable of graphically displaying a great variety of linear scales; to provide such an instrument including a plurality of rows of column aligned display elements which can represent major scale divisions by activating all the elements in a column, scale subdivisions by activating fewer than all the elements in a column, and minor subdivisions by activating still fewer elements in a column; to provide such an instrument wherein the individual display elements are interconnected in selected groups for simultaneous activation; to provide such an instrument wherein bit patterns are stored in a memory which can be addressed to cause the activation of selected groups of the display elements to represent corresponding linear scales; to provide such an instrument including an encoder device having scale selection switches connected thereto and which generates a unique memory address for each switch operated; to provide such an instrument in the form of a drafting machine scale; to provide such an instrument which is low in power consumption; and to provide such a programmable engineering scale instrument which is economical to manufacture, convenient in use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
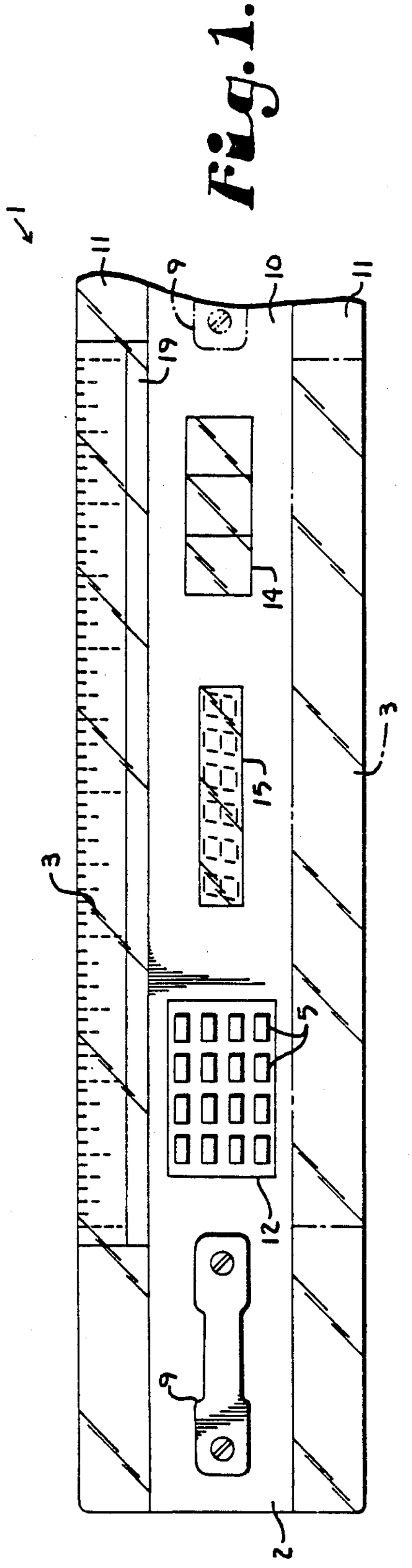
FIG. 1 is a fragmentary plan view of a drafting machine scale instrument in which a programmable display engineering scale embodying the present invention is incorporated.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a scale instrument incorporating a programmable display engineering scale according to the present invention. The instrument 1 generally includes a planar scale base 2, an electronic scale display device 3 formed of a plurality of individual display elements 4 and positioned on the base 2, scale selection switches 5, and circuitry 6 connected between the switches 5 and the display device 3 to cause the activation of selected patterns of the display elements 4 to form corresponding linear scales.

The illustrated scale base 2 is in the form of a drafting machine scale and includes connectors or clips 9 positioned along a center portion 10 of the scale base 2 for cooperation with sockets of a drafting machine head (not shown). The scale base 2 has beveled edge portions 11 extending along either side of the center portion 10. The center portion 10 provides for the mounting of a keypad 12 including the scale selection switches or keys 5, the circuitry 6, a power source such as a battery or a photovoltaic cell 14, and possibly a numeric display 15. At least one of the beveled edge portions 11 has a scale display device 3 mounted thereon and extending along an edge of the scale base 2. The scale base 2 may also have a second scale display device 3 along its other edge and a pair of mounting clips 9 such that the scale base 2 is reversible end to end. The scale base 2 is preferably transparent as are the scale display devices 3 for convenience in drafting use. Conductors which interconnect the display elements 4 to the circuitry 6 are also preferably transparent. While the scale base 2 is illustrated as a drafting machine scale, the present invention is not limited to such use. The scale base 2 could also be in the form of a rule, template, protractor, meter face, dial face, linear slide rule, circular slide rule or other type of instrument.

Figure 6:
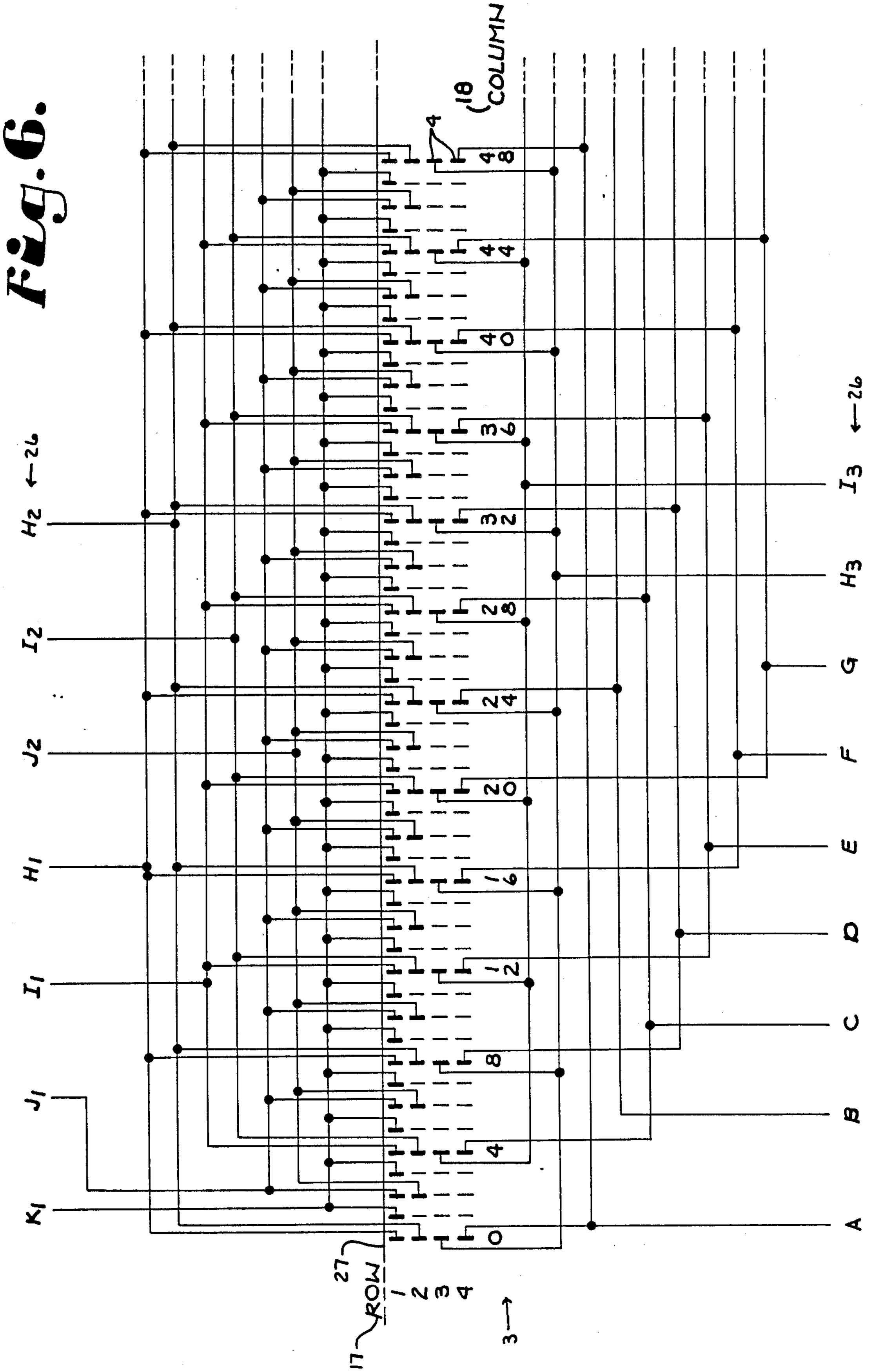
FIG. 6 is a greatly enlarged fragmentary diagrammatic view of an electronic display device for use in the programmable scale according to the present invention and the interconnection of groups of the display elements for simultaneous activation.

As viewed in FIGS. 1 and 6 the scale display device 3 includes four horizontally extending and aligned rows 17 of display elements 4 which form vertically extending and aligned columns 18. In a preferred embodiment of the present invention, the scale display device 3 is a liquid crystal display (LCD) device. The display elements 4 are elongated in the column direction to form columns of vertical dashes. Preferably, the display elements 4 are closely spaced such that when two adjacent elements in a column are activated, they appear almost as a single line. The length, width, and column spacing of the display element 4 are exaggerated in the drawings to better illustrate the ability to activate the display elements 4 individually. It is currently possible to form LCD devices with at least about 64 elements per inch (equivalent to about 25 elements per centimeter); however, the precise number of display elements 4 in a row 17 depends on the variety of linear scales to be displayed. Further, in some linear scales, it is not necessary that all the rows 17 have equal numbers of display elements. Depending on the capabilities of the circuitry 6, the display device 3 may include a numeric section 19 somewhat similar to the numeric display 15 and including display elements (not shown) which can be activated to form numerals to identify selected scale divisions and subdivisions. While the display device 3 is preferably an LCD device, other display technologies are also contemplated.

A number of arrangements are contemplated for activating the display elements 4 in a coordinated manner to display various scales. In general, the circuitry 6 includes a memory such as a read-only memory 20 which stores bit patterns analogous to activation patterns of either individual display elements 4 or groups of display elements. A memory control device 21 controls the read-out of the bit patterns stored in the memory 20 in response to the input of information from an input device, such as the keypad 12, to form the desired scale patterns. Such a memory control device could be in the form of a microprocessor. A microprocessor could be programmed in such a manner as to cooperate with a non-volatile memory to display preset scales and with a volatile memory to display user originated scales. User originated scales could be formed by scanning the rows of display elements 4 using a displayed cursor and by activating selected display elements 4. The control circuitry 6 need not be necessarily mounted within the scale base 2 but could be a separate unit with facilities such as a mass storage device for storing user originated scale patterns. Such an elaborate control scheme is not illustrated in the drawings.

In the illustrated scale instrument 1, the control circuitry 6 is greatly simplified to maximize power efficiency. The circuitry 6 is preferably implemented using complementary symmetry metal oxide semiconductor (CMOS) technology or other low power consumption technology. This in cooperation with the LCD devices allows the scale instrument 1 to be powered by a small battery, such as are used in electronic watches and small calculators, or the photovoltaic cell 14, commonly referred to as a solar cell. If powered by a photovoltaic cell 14, the scale instrument 1 could only be used in situations where sufficient ambient illumination is available. However, this does not present a serious problem since most applications of the scale instrument 1 would require at least an amount of illumination that would be sufficient for the photovoltaic cell, no matter how the instrument 1 is powered.

Figure 2:
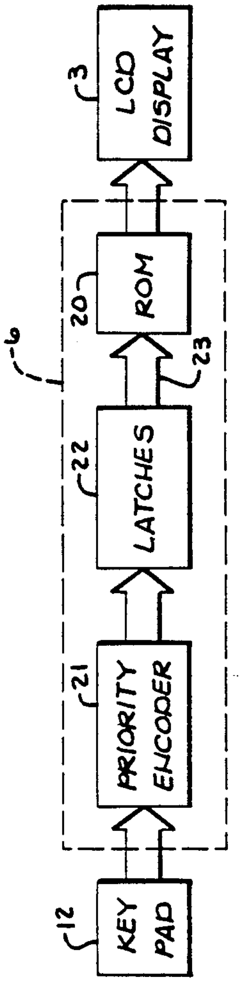
FIG. 2 is a simplified block diagram of the circuitry employed in the programmable scale of the present invention.
Figure 5:
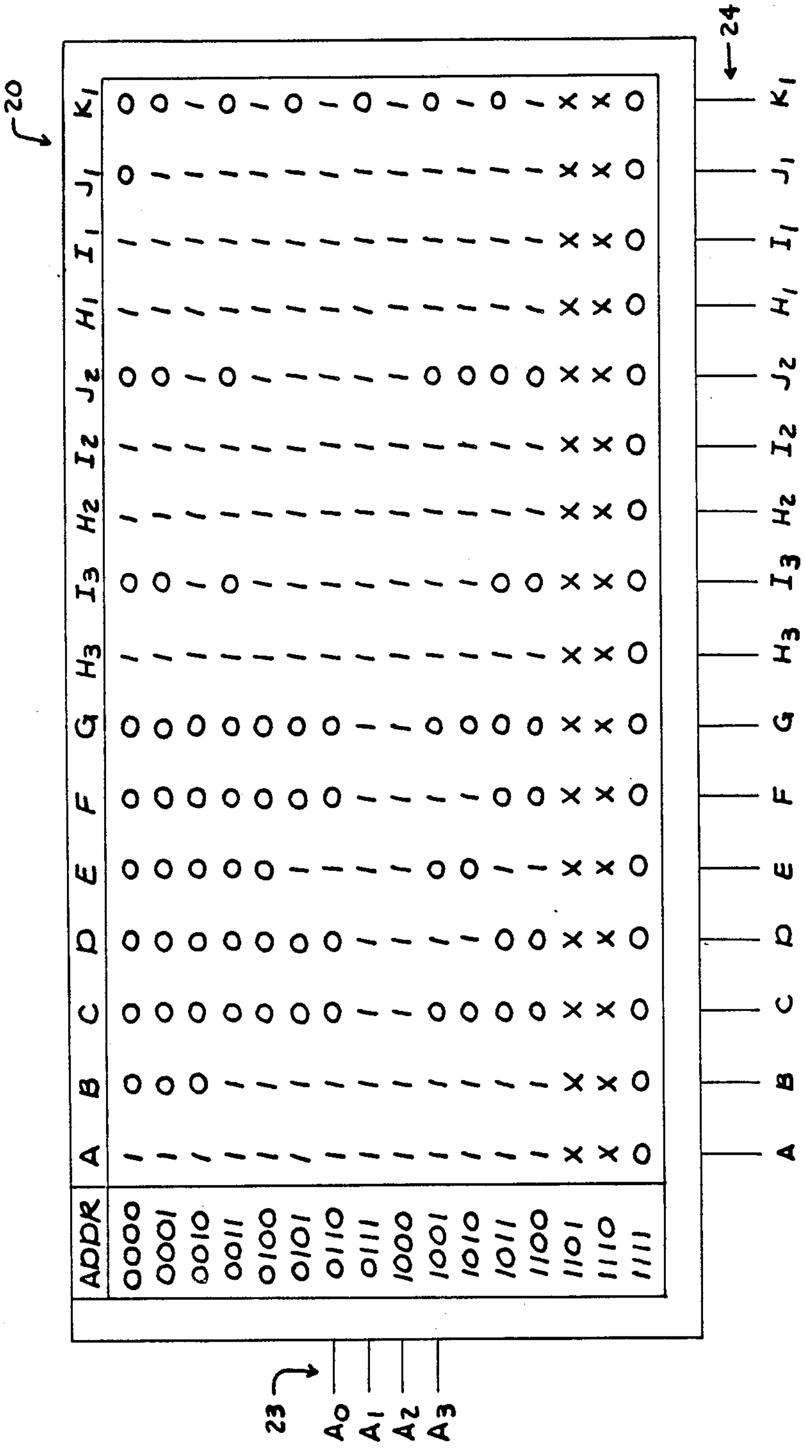
FIG. 5 is a diagrammatic view of a memory device and the bit patterns stored therein which may be addressed to cause the activation of corresponding groups of the display elements of the programmable scale.

As illustrated in FIG. 2, the memory control device 21 is a priority encoder. Such devices have a plurality of inputs for connection to switches and circuitry to generate a unique binary number for each switch closed as well as to arbitrate multiple switch closures. In the scale instrument 1, two eight-to-three line priority encoders are interconnected in a conventional manner to form a sixteen-to-four line priority encoder. The closure of each of the sixteen selection switches 5 causes the generation of a unique four digit binary number which is used to address the memory 20. A set of four latches 22 is connected between the priority encoder 21 and the address lines 23 of the memory 20 and latch the binary number generated by the encoder 21 on the address lines 23 of the memory 20. This causes a bit pattern word stored at a location identified by the binary number to be read out from the memory 20 to its data lines 24 (FIG. 5). The bit pattern which is read out from the memory 20 causes the activation of an analogous pattern of display elements 4, or groups of display elements 4, to form a desired scale pattern.

In a preferred embodiment of the scale instrument 1, the display elements 4 are interconnected in selected groups for simultaneous activation. This simplifies the control circuitry 6 in that with group activation, it is not necessary to store an exact analogous bit pattern of the desired scale pattern in the memory 20. Referring to FIG. 6, the display elements 4 for a single inch length of a display device 3 and an exemplary interconnection pattern are diagrammatically illustrated. The illustrated display device 3 has forty-eight columns of display elements 4 per inch which is useful for displaying scales related to feet in length since forty-eight is divisible by twelve.

Terminals 26 of the display device 3 are labeled with letters A through Kl. The rows 17 of display elements 4 are numbered as rows 1 through 4 from an edge 27 of the display device 3. Terminals A through G connect to patterns of display elements 4 in the fourth row 17 of the display device 3. The row numbers of the remaining terminals 26 are indicated by a subscript. For example, terminal Kl refers to certain display elements in the first row, terminal H2 refers to the second row, and the like. The terminal Kl interconnects all the display elements in odd numbered columns in the first row. Thus, when the correct voltage level is placed on terminal Kl, all these display elements 4 are simultaneously activated. In an LCD display device, the display elements darken and become visible when activated. In a similar manner, other groups of display elements 4 are interconnected. Some of the display elements 4 in FIG. 6 are not connected to a terminal 26. Such unconnected display elements 4 are not used in the illustrated interconnection pattern. However, other interconnection patterns might use them.

FIG. 5 diagramatically illustrates a memory 20 and exemplary contents therein to activate a number of patterns of display elements 4 for useful scales using the interconnection pattern shown in FIG. 6. The memory 20 is a non-volatile read-only memory with four address lines 23 whereby sixteen memory locations can be addressed. The data lines 24 are labeled in the same manner as the terminals 26 of the display device 3 shown in FIG. 6, and correspondingly labeled data lines 24 and terminals 26 are interconnected. The memory 20 is shown to have a 16 bit data width. However, more conventionally available memory devices having eight bit or four bit widths may be employed by paralleling corresponding address lines 23.

Figure 3:
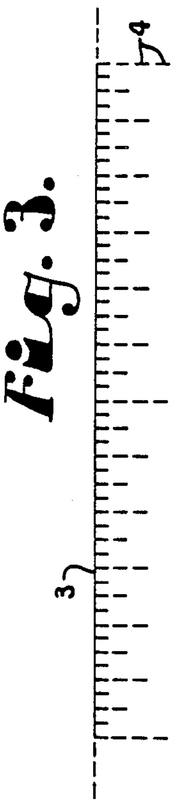
FIGS. 3 and 4 are enlarged fragmentary diagrammatic views of a portion of the display device of the programmable scale and illustrate patterns of activated display elements corresponding to two exemplary linear scales which may be selected.
Figure 4:

Within the diagram of the memory 20, the 1's correspond to groups of display elements 4 which will be activated if written to the display device 3 while O's correspond to goups of display elements which will be blanked. FIGS. 3 and 4 fragmentarily illustrate an inch in length of the display device 3 shown in FIG. 6 when certain memory words are written thereto. The pattern shown in FIG. 3 is generated by writing the bit pattern of address 0100 to the memory 20. The scale illustrated in FIG. 3 might be useful for drawing at a scale ratio wherein one inch equals two feet with half inch scale resolution. Similarly, the pattern shown in FIG. 4 corresponds to memory address 0011. The display element pattern shown in the display device 3 of FIG. 1 corresponds to memory address 0000. Memory address 1000 causes all the interconnected groups of display elements 4 in FIG. 6 to be activated. Conversely, memory address 1111 causes all the display elements 4 to be blanked. This might be desirable under some circumstances, such as at power up, when some elements might be randomly activated. However, it is not absolutely needed in the illustrated scale instrument 1 since when a selection switch 5 is closed, all the interconnected groups are either positively activated or blanked. The X's at address 1101 and 1110 represent unused words in the memory 20.

The scale instrument 1 may be fabricated using conventional manufacturing methods such as are used for forming very thin pocket calculators. The sixteen keys 5 of the keypad 12 can be used to select more than sixteen scale patterns by the provision of additional circuitry to interpret one of the keys 5 as a shift key. No circuitry is illustrated for activating the numeric display 15 or the numeric section 19 of the display device 3. The numeric display 15 might be useful for numerically indicating which scale has been selected. Circuitry for implementing such functions would readily occur to one skilled in the electronic arts.

It is to be understood that while certain forms of the present invention have been illustrated and described herein, it is not to be limited to the specific forms or arrangement of parts described and shown.

What is claimed and desired to be secured by Letters Patent is a follows:

1. A programmable display scale comprising:
(a) a scale base;
(b) an electronic display device positioned on said base;
(c) said display device including a plurality of rows of display elements;
(d) a plurality of scale selection switches positioned on said base; and
(e) circuit means interconnected among said switches and said display elements whereby the operation of said switches causes the activation of coordinated patterns of said display elements in said plurality of rows to form associated spacial scale divisions and subdivisions.

2. A scale as set forth in claim 1 wherein:
(a) selected groups of said display elements are interconnected for simultaneous activation.

3. A scale as set forth in claim 1 wherein:
(a) said circuit means includes a memory device storing bit patterns analogous to patterns of activation of said display elements; and
(b) said switches are at least indirectly connected to said memory device in such a manner that the operation of selected switches causes the readout of corresponding bit patterns from said memory device to cause the activation of corresponding patterns of said display elements.

4. A scale as set forth in claim 3 including:

(a) encoder means at least indirectly connected between said switches and said memory device, said encoder means generating a unique memory address upon the operation of an associated switch, each memory address being associated with a selected bit pattern stored in said memory device, and the generation of a memory address causing the readout of said selected bit pattern from said memory device.

5. A scale as set forth in claim 1 wherein:

(a) said scale base is sized and shaped as a drafting machine scale; and (b) said scale base includes clip means to removably attach said scale base to a drafting machine.

6. A scale as set forth in claim 1 wherein:

(a) said scale includes an elongated scale edge;

(b) each of said display elements is elongated in shape and is oriented substantially perpendicular to said scale edge;

(c) said rows of said display elements are arranged in columns which are longitudinally aligned perpendicular to said scale edge;

(d) the activation of all the display elements in a column forms a scale division; and (e) the activation of less than all the display elements in a column forms a scale subdivision.

7. A scale as set forth in claim 1 wherein:

(a) said circuit means is powered by a photovoltaic cell.

8. A scale as set forth in claim 1 wherein:

(a) said display device is a liquid crystal display device.

9. A programmable display scale comprising:

(a) a planar scale base;

(b) an electronic display device positioned on said base;

(c) said display device including a plurality of substantially parallel rows of display elements;

(d) a plurality of scale selection switches positioned on said base;

(e) circuit means interconnected among said switches and said display elements whereby the operation of said switches causes the activation of coordinated patterns of said display elements in said plurality of rows to form associated spacial scale divisions and subdivisions, said circuit means including a memory device and encoder means;

(f) said memory device being connected at least indirectly to said display device and storing, at selected memory addresses, bit patterns associated with patterns of activation of said display elements;

(g) said encoder means being connected to said switches and at least indirectly to said memory device and generating unique memory addresses upon the operation of switches associated with said addresses; and (h) the generation of a unique memory address causing a bit pattern stored at said address to be read out of said memory device to said display device to activate a pattern of display elements in said plurality of rows associated with said bit pattern.

10. A scale as set forth in claim 9 wherein:

(a) said scale includes an elongated scale edge;

(b) each of said display element is elongated in shape and is oriented substantially perpendicular to said scale edge;

(c) said rows of said display elements are arranged in columns which are longitudinally aligned perpendicular to said scale edge;

(d) the activation of all the display elements in a column forms a scale division; and (e) the activation of less than all the display elements in a column forms a scale subdivision.

11. A scale as set forth in claim 9 wherein:

(a) said circuit means is powered by a photovoltaic cell.

12. A scale as set forth in claim 9 wherein:

(a) selected groups of said display elements are interconnected for simultaneous activation.

13. A scale as set forth in claim 9 wherein:

(a) said display device is a liquid crystal display device.

14. A scale as set forth in claim 9 wherein:

(a) said scale base is sized and shaped as a drafting machine scale; and (b) said scale base includes clip means to removably attach said scale base to a drafting machine.

15. A programmable display scale comprising:

(a) a planar scale base;

(b) an electronic display device positioned on said base;

(c) said display device including a plurality of substantially parallel rows of display elements;

(d) selected groups of said display elements are being interconnected for simultaneous activation;

(e) a plurality of scale selection switches positioned on said base;

(f) circuit means interconnected among said switches and said display elements whereby the operation of said switches causes the activation of coordinated patterns of said display elements in said plurality of rows to form associated spacial scale divisions and subdivisions, said circuit means including a memory device and encoder means;

(g) said memory device being connected at least indirectly to said display device and storing, at selected memory addresses, bit patterns associated with patterns of activation of said display elements;

(h) said encoder means being connected to said switches and at least indirectly to said memory device and generating unique memory addresses upon the operation of switches associated with said addresses;

(i) the generation of a unique memory address causing a bit pattern stored at said address to be read out of said memory device to said display device to activate a pattern of display elements in said plurality of rows associated with said bit pattern;

(j) said scale base being sized and shaped as a drafting machine scale; and (k) said scale base including clip means to removably attach said scale base to a drafting machine.

16. A scale as set forth in claim 15 wherein:

(a) said scale includes an elongated scale edge;

(b) each of said display elements is elongated in shape and is oriented substantially perpendicular to said scale edge;

(c) said rows of said display elements are arranged in columns which are longitudinally aligned perpendicular to said scale edge;

(d) the activation of all the display elements in a column forms a scale division; and (e) the activation of less than all the display elements in a column forms a scale subdivision.

17. A scale as set forth in claim 15 wherein:

(a) said circuit means is powered by a photovoltaic cell.

18. A scale as set forth in claim 15 wherein:

(a) said display device is a liquid crystal display device.

* * * * *